United States Patent [19]

Senoh et al.

[11] Patent Number: 5,274,652
[45] Date of Patent: Dec. 28, 1993

[54] HARMONIC WAVE GENERATOR, A METHOD OF PRODUCING A HARMONIC WAVE AND A READING APPARATUS FOR AN OPTICAL RECORDING MEDIUM USING THE HARMONIC WAVE GENERATOR OR THE METHOD OF PRODUCING A HARMONIC WAVE

[75] Inventors: Tadanori Senoh; Yuzuru Tanabe, both of Yokohama; Motoichi Ohtsu, Yamato, all of Japan

[73] Assignee: Asahi Glass Company Ltd., Tokyo, Japan

[21] Appl. No.: 47,032

[22] Filed: Apr. 12, 1993

Related U.S. Application Data

[63] Continuation of Ser. No. 791,105, Nov. 13, 1991, abandoned.

[30] Foreign Application Priority Data

Nov. 15, 1990 [JP] Japan .................. 2-307079
Jan. 25, 1991 [JP] Japan .................. 3-025558
May 10, 1991 [JP] Japan .................. 3-135459

[51] Int. Cl.⁵ ............................. H01S 3/10
[52] U.S. Cl. .......................... 372/22; 359/328; 385/122
[58] Field of Search ........... 372/21, 22; 359/328; 385/122

[56] References Cited

U.S. PATENT DOCUMENTS

| | | | |
|---|---|---|---|
| 3,611,436 | 10/1971 | Rigrod | 372/20 |
| 3,648,193 | 3/1972 | Foster et al. | 372/22 |
| 3,830,558 | 8/1974 | Deserno et al. | 372/22 |
| 4,427,260 | 1/1984 | Puech et al. | 359/328 |
| 4,748,631 | 5/1988 | Bjorklund | 372/21 |
| 5,028,816 | 7/1991 | Boczar | 372/21 |

*Primary Examiner*—Léon Scott, Jr.
*Attorney, Agent, or Firm*—Oblon, Spivak, McClelland, Maier & Neustadt

[57] ABSTRACT

A harmonic wave generator comprises a semiconductor laser for generating a fundamental wave and a KNbO₃ crystal which transforms the fundamental wave to a harmonic wave, wherein the KNbO₃ crystal is provided with electrodes for applying an electric field to a pair of opposing surfaces of the crystal.

17 Claims, 3 Drawing Sheets

HARMONIC WAVE GENERATOR, A METHOD OF PRODUCING A HARMONIC WAVE AND A READING APPARATUS FOR AN OPTICAL RECORDING MEDIUM USING THE HARMONIC WAVE GENERATOR OR THE METHOD OF PRODUCING A HARMONIC WAVE

This application is a continuation of application Ser. No. 07/791,105, filed on Nov. 13, 1991, now abandoned.

BACKGROUND OF THE INVENTION

1. Field of the Invention

The present invention relates to a harmonic wave generator in which a nonlinear optical member includes a resonator for resonating a fundamental wave so that the output harmonic wave can be modulated.

2. Discussion of Background

FIG. 5 is a diagram showing a conventional apparatus for producing a second harmonic wave in which an external resonator is used. In FIG. 5, reference numeral 1 designates a semiconductor laser (LD) for producing a fundamental wave, numeral 8 designates a collimate lens, numeral 3 designates a mirror used as an external resonator which resonates the fundamental wave (hereinafter, referred to as a ω light), numeral 8A designates a mode matching lens for matching a resonance mode in the external resonator with an incident beam, numeral 4 designates a nonlinear optical member such as a $KNbO_3$ crystal or the like, numeral 5 designates a dichloic mirror which transmits the second harmonic wave (hereinbelow, referred to as a 2ω light) while the ω light is reflected, and numeral 2 designates a PZT element provided with a mirror for locking a resonant frequency by feeding-back the ω light to the semiconductor laser LD1. Numeral 6 designates a photodiode (PD) for detecting the ω light reflected by the dichloic mirror, and numeral 7 designates a controller which actuates the PZT element on the basis of a signal detected by the PD 6 whereby the angle of the mirror attached thereto is changed.

In the above-mentioned conventional second harmonic wave generator, it is important, in order to increase the luminous intensity of the second harmonic wave, that the phase of the ω light is matched with the phase of the 2ω light in the nonlinear optical member, namely, the refractive index nω of the ω light is matched with the refractive index n2ω of the 2ω light in the nonlinear optical member.

In the conventional technique for such phase matching, the nonlinear optical member is constituted by a Peltier element or the like and the element is kept at a constant temperature so that the phase matching can be performed. Temperature control of the nonlinear optical member should be precise as ±0.1° C. or less. The Peltier element stops the generation of the 2ω light due to a small change of temperature, and accordingly, the temperature should be precisely controlled so as to effect good phase matching.

There is another method to adjust the luminous intensity of the 2ω light by modulating the output of a semiconductor laser or the like which is used as a light source for the ω light. However, such method has a problem that the resonant frequency of the semiconductor laser by the ω light feed-back from the external resonator becomes easily unstable, whereby frequent generation of the 2ω light becomes impossible. Therefore, in the past, it was difficult to control precisely the luminous intensity of the 2ω light.

Further, the application of an electric field to the nonlinear optical member might cause twinning or breaking of the nonlinear optical member, and in the worst case, it may became in an inoperable state.

SUMMARY OF THE INVENTION

It is an object of the present invention to eliminate the above-mentioned problems and to provide a harmonic wave generator comprising a light source for generating a fundamental wave and a nonlinear optical member including a resonator, which transforms the fundamental wave to a harmonic wave, wherein the nonlinear optical member is provided with electrodes for applying an electric field to at least a pair of opposing surfaces.

DETAILED DESCRIPTION OF PREFERRED EMBODIMENT

Preferred embodiments of the present invention will now be described with reference to the drawings.

Figure 1:
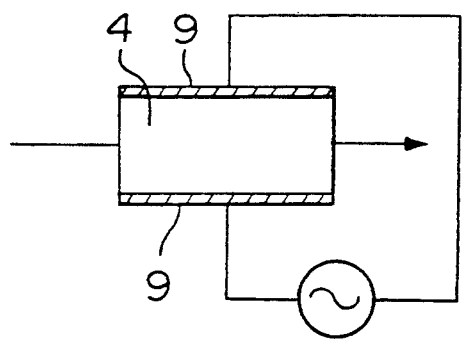
FIGS. 1 and 2 are diagrams showing a $KNbO_3$ crystal according to an embodiment of the present invention.
Figure 5:
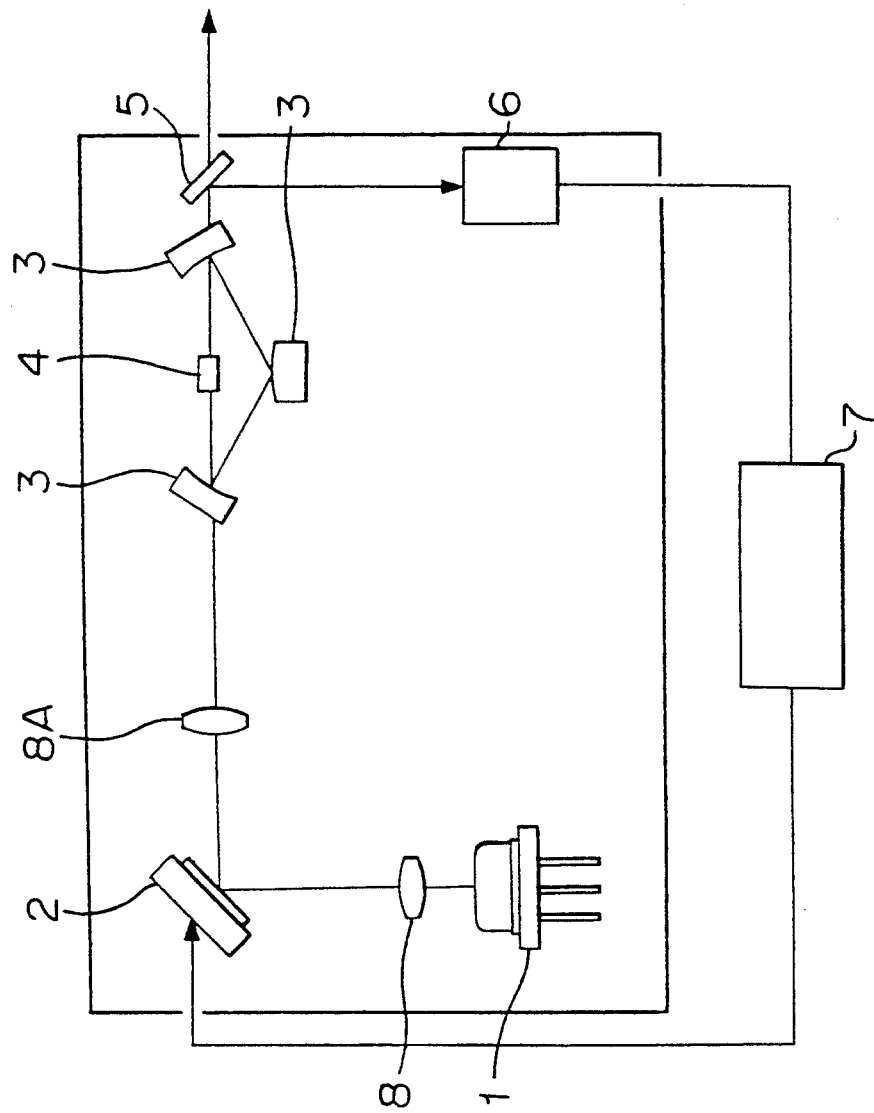
FIG. 5 is a block diagram showing a conventional harmonic wave generator.

FIG. 1 shows a nonlinear optical member used for an embodiment of the harmonic wave generator of the present invention. The construction of the harmonic wave generator of the present invention is the same as that as shown in FIG. 5 except for a nonlinear optical member 4 in FIG. 1.

A $KNbO_3$ crystal 4, as a nonlinear optical crystal, on which electrodes 9 for applying an electrode field are provided is disposed on the optical axis of a ω light in a triangular ring-shaped external resonator. A Peltier element is provided for the $KNbO_3$ crystal 4 so that a temperature for effecting good phase matching is maintained, whereby the luminous intensity of the 2ω light is changed by forming an electric field by the electrodes 9. At this moment, resonating mirror 3 for the ω light is inclined to the optical axis of the ω light so that a reflecting light of the ω light does not return to the semiconductor laser (LD) 1 as a light source. Stabilization of the frequency of light from the LD 1 is effected by an optical feed-back method wherein a weak scattering light produced in the external resonator is returned to the LD1.

As the resonator for resonating the fundamental wave in the present invention, an external type resonator wherein a nonlinear optical member is disposed in a resonator which is constituted by a plurality of resonating mirrors 3 may be used. Alternatively, a monolithic type resonator wherein a fundamental wave is resonated in a form of a triangular ring in a nonlinear optical member may be used. Since the monolithic type resonator does not use the resonating mirrors 3 and the fundamental wave is directly incident from a light source such as an LD or the like to the nonlinear optical member, an optical loss is small and high transforming efficiency can be obtained.

As the external resonator, a polygonal resonator such as a triangular resonator, a quadrant resonator or one having sides more than four may be used. However, when the number of mirrors is too large, the optical loss is large; it is difficult to adjust the optical axis, and the number of parts constituting the resonator is large. Accordingly, use of a triangular resonator is preferred.

As the nonlinear optical member, a nonlinear optical crystal such as $KNbO_3$, $\beta\text{-}BaB_2O_4$, $KTiOPO_4$, $KH_2PO_4$, $LiNbO_3$, $MgO: LiNbO_3$ or an organic nonlinear optical material may be used.

As the light source, various kinds of solid state lasers or various kinds of gas lasers can be used. However, an LD is preferably used because it is compact and has a light weight.

Further, the present invention is applicable to modulation of harmonic waves other than the second harmonic wave.

Since the $KNbO_3$ crystal used as the nonlinear optical member has anisotrophy, the direction of polarization of the $\omega$ light agrees with the direction of the b axis of the crystal, and the direction of polarization of the $2\omega$ light agrees with the c axis direction of the crystal. It is preferable that the application of an electric field in the c axis direction provides good response characteristics for a change of the refractive index to the electric field, hence the $2\omega$ light can be effectively modified. Further, when an electric field is applied into the b axis direction in addition to the c axis direction, the magnitude of modulation can be increased.

A material having a polarization structure such as the $KNbO_3$ crystal has a problem such as the reversing or twinning of the polarization structure. However, such a problem can be solved by, for instance, applying a negative modulating electric field to the +c face electrode of the $KNbO_3$ crystal and by applying a positive modulating electric field to the −c face electrode. Further, a problem such as the twinning due to occurrence of partial strain can be solved by proving evenly the electrodes on the c faces.

Further, in place of keeping the nonlinear optical member at a temperature capable of phase matching, a d.c. voltage (bias voltage) may be applied to it for phase matching so that the electric field is changed with respect to the bias point.

Figure 3:
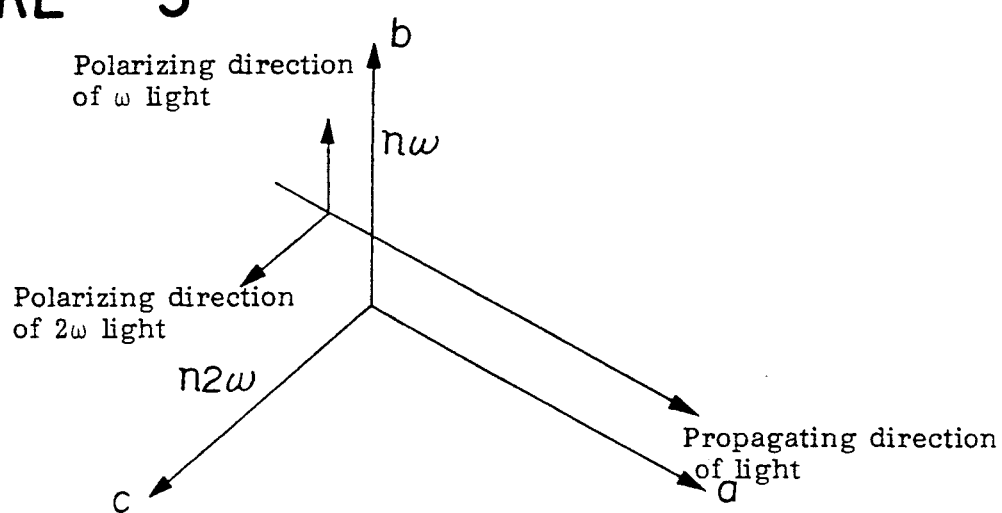
FIG. 3 is a diagram showing a state of propagation of a fundamental wave and a second harmonic wave in the $KNbO_3$ crystal.

As shown in FIG. 3, the directions of polarization of the $\omega$ light and and the $2\omega$ light passing through the nonlinear optical crystal are 90° different from each other, and the response characteristics of the refractive index of the crystal to an electric field applied thereto is different depending on the direction of the crystal axes.

Accordingly, conditions for phase matching are largely changed if the intensity of an electric field is changed along the c axis direction which shows good response characteristics to the electric field, whereby the luminous intensity of the $2\omega$ light can be effectively and precisely modulated. Further, since the $\omega$ light agrees with the b axis which shows mild response characteristics to the electric field, little influence given from the electric field intensity. Accordingly, there is no danger of injuring a resonating state because there is no influence to the $\omega$ light by the electric field, and accordingly, there is no danger of breaking the locking state of the resonant frequency of the LD because of the $\omega$ light which is fed back from the external resonator to the LD; thus, the modulation of the $2\omega$ light becomes possible.

The change of the refractive index of the crystal with respect to an electric field wherein a $KNbO_3$ crystal is used as the nonlinear optical member is expressed by the index ellipsoid described below:

$$(1/n_2^2 + r_{23}E_3)x_3^2 + (1/n_3^2 + r_{33}E_3)x_3^2 + 2r_{42}E_2X_2X_3 = 1$$

where $n_2$ is the refractive index of the crystal on the b axis when no electric field is applied, $n_3$ is the refractive index on the c axis when no electric field is applied, $E_2$ and $E_3$ respectively represent the electric field (V/m) in the directions of the b axis and the c axis, $r_{23}$, $r_{33}$, $r_{42}$ are respectively an electro-optic coefficient (m/V) in the b axis direction when an electric field is applied in the c axis direction, an electro-optic coefficient in the c axis direction when an electric field is applied in the c axis direction and an electro-optic coefficient concerning the rotation of the refractive index distribution in the b-c face when an electric field is applied in the b axis direction, and $x_2$, $x_3$ denote the coordinate on the b axis and c axis.

In the above equation, $r_{23} = 2 \times 10^{-12}$, $r_{33} = 25 \times 10^{-12}$ and $r_{42} = 270 \times 10^{-12}$. By applying an electric field in the c axis direction or both the c axis and b axis directions, $r_{33}$ or both the $r_{33}$ and $r_{42}$ can be utilized to largely change the refractive index whereby the conditions for phase matching is broken, and the $2\omega$ light can be largely modulated.

In the following, several embodiments of the present invention will be described.

EXAMPLE 1

An example of the present invention will be described with reference to FIGS. 1 and 5. A $\omega$ light having a wavelength of about 860 nm and an output of 100 mW from a single vertical-lateral mode GaAs type semiconductor laser (LD) 1 was modified into a parallel light by means of a collimater lens 8. The parallel light was reflected by the PZT element 2 with a mirror, and the reflected light was incident into a triangular ring-shaped external resonator constituted by three mirrors 3 through the mode matching lens 8A for matching the resonating mode in the external resonator with an incident beam. At this moment, the light directly reflected by the incident side mirror 3 did not return to the LD 1 because the directly reflected light was deflected from the incident light axis.

In the external resonator, the power of the $\omega$ light is multiplied since resonation is effected in the clockwise direction in the drawing. The $\omega$ light is transformed into the second harmonic wave $2\omega$ light ($\lambda = 430$ nm) in the $KNbO_3$ crystal 4 (having a length of 5 mm × a width of 1 mm × a height of 3 mm) which is disposed at a position on the resonating optical axis. In this case, the $KNbO_3$ crystal 4 is held at 27° C. by the Peltier element so that the phases of the $\omega$ light and $2\omega$ light are matched, and the $\omega$ light is incident in the direction of polarization which is parallel to the b axis of the $KNbO_3$ crystal 4, while the $2\omega$ light is emitted in the direction of polarization which is parallel to the c axis direction which is perpendicular to the b axis.

The electrode 9 on the c face of the $KNbO_3$ crystal 4 was formed at one time by vapor deposition of Cr/Au film comprising a Cr film as an undercoat layer, a composite film of Cr and Au as a middle layer and an Au film as a top layer, followed by coating evenly a coating type electrode with use of a material such as an Ag paste on the Cr/Au film in its entirety of the c face. In the vapor deposition of the Cr/Au film on the entire c face, a mask for vapor deposition was not used, and a protective film of a resist was applied to the a face and the b face to thereby prevent the Cr/Au film from depositing. Further, a mat surface was formed on the c face of the $KNbO_3$ crystal 4 in order to increase the bonding strength of the Cr/Au film.

An a.c. voltage of 100 V in terms of peak-to-peak was applied at a frequency of 1 KHz to the c axis direction of the $KNbO_3$ crystal 4 with use of a synthesizer and an amplifier. As a result, the output of the $2\omega$ light having a wavelength of about 430 nm and an output power of 3 mW was modulated at a modulation degree of 5%.

EXAMPLE 2

Figure 2:
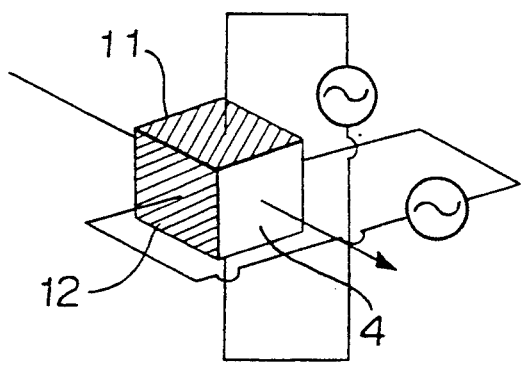

The second example of the harmonic wave generator of the present invention will be described with reference to FIG. 2.

The construction of the harmonic wave generator is the same as that shown in FIG. 5 except that two pairs of electrodes 11 and 12 are provided on the $KNbO_3$ crystal 4 so that an electric field is applied in the directions of the b axis and the c axis of the crystal. The electrodes 11 and 12 were provided in the same manner as Example 1 except for the a face.

An a.c. voltage of 50 V in terms of peak-to-peak was applied to the crystal at 1 KHz. As a result, the output of the $2\omega$ light having a wavelength of about 430 nm and an output of 4 mW was modulated at a modulation degree of 80%.

EXAMPLE 3

The same apparatus as used in Example 1 was used. A rectangular wave having a voltage 250 V in terms of peak-to-peak was applied at a frequency of 1 KHz to the electrode 9 so that the +c face side became a negative polarity and the −c face side became a positive polarity. As a result, the output of the $2\omega$ light of a wavelength of about 430 nm and an output of about 5 mW was modulated at a modulation degree of 90% or more. In this Example, no damage such as twinning occurred in the $KNbO_3$ crystal because of the above-mentioned direction and polarity of the electric field applied.

For comparison, a voltage of about 100 V was applied so that the +c face of the crystal 4 became positive and the −c face became negative. As a result, twinning was recognized in the $KNbO_3$ crystal 4. The twin did not disappear even when the voltage was changed to 0 V, or a voltage was applied so that the polarity became opposite. Therefore, the $KNbO_3$ crystal 4 became inoperable.

In the above-mentioned Examples 1 through 3, an optical feed-back method is used in order to stabilize the frequency of the LD1. Namely, when a triangular ring-shaped external resonator is used, the stabilization of the frequency is effected by introducing into the LD1 a weak wave propagating in the opposite direction (in the counterclockwise direction in the drawing) at about 30 dB–50 dB, the oppositely propagating wave being produced by the scattering of the $\omega$ light in the resonator. The external resonator functions as a narrow band filter, and the frequency of light from the LD1 is automatically pulled into the resonating frequency of the resonator, whereby a stable state is obtainable (i.e. a locked state).

In this case, for the optical feed-back and the stabilization of the external resonator system, the PZT element 2 is used in order to effect automatic phase matching of the reflected light. Namely, the $\omega$ light reflected by the dichloic mirror 5 (which reflects the $\omega$ light and transmits the $2\omega$ light) is monitored by the photodiode (PD) 6, and the PZT element 2 is controlled by the controller 7 so that the intensity of the transmitted light becomes greatest. The locked state could be substantially maintained and unchanged even when an electric field is applied to the $KNbO_3$ crystal.

The optical feed-back method used in the present invention has an advantage that it is unnecessary to adjust the optical axis because the optical axis of returning light due to the scattering is the same as the optical axis of the incident light.

Further, since the second harmonic wave generator capable of modulating the $2\omega$ light can be used not only as a data detecting light source for the pick up for an optical recording medium such as an optical disc or an optical-magnetic disc, but also as a light source for data recording for the optical recording medium, it is possible to read and write high density data. Further, when the harmonic wave generator of the present invention is used as a light source for transferring data stored in a light sensitive drum for a laser printer, it is possible to transfer colored characters and symbols.

Figure 4:
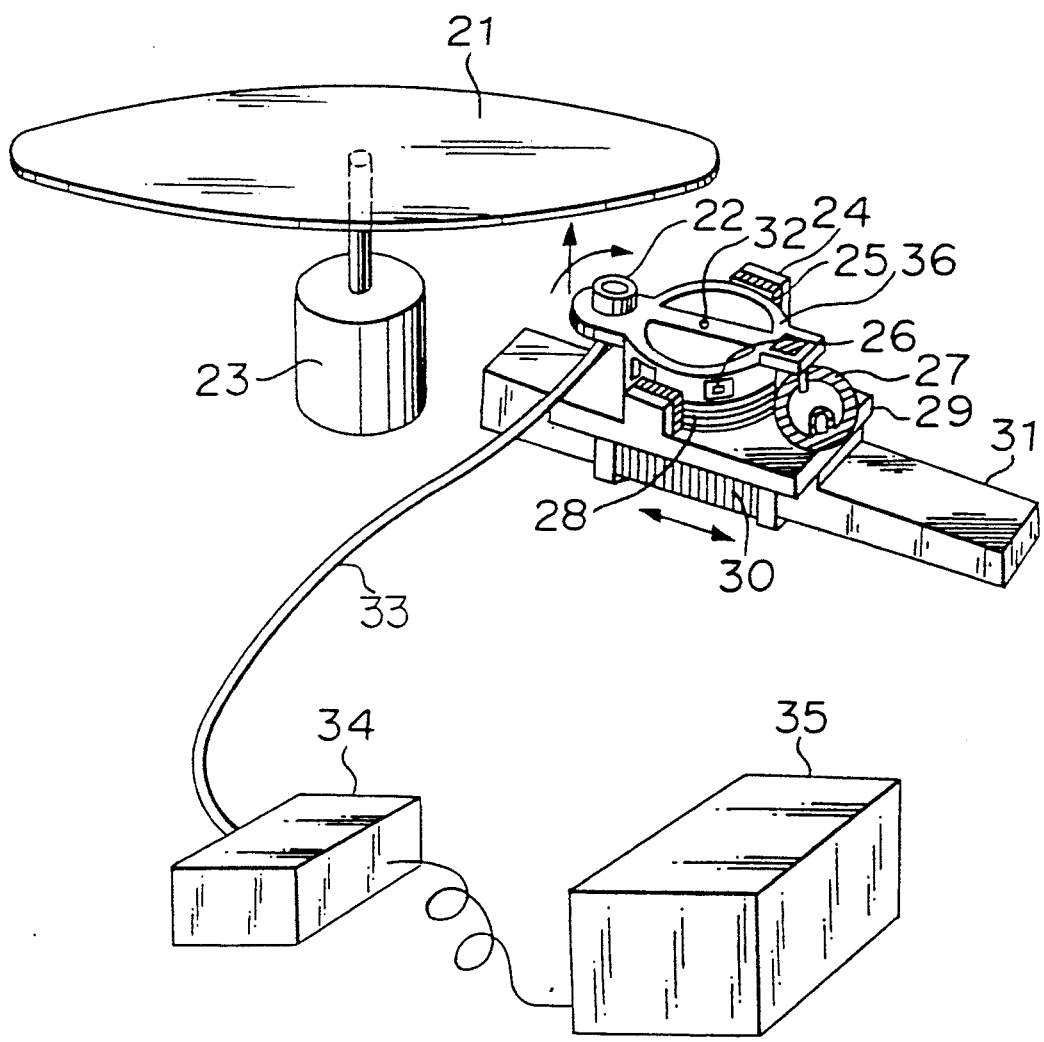
FIG. 4 is a perspective view of an embodiment of an optical data reading apparatus in which the second harmonic wave generator of the present invention is installed.

FIG. 4 is a perspective view showing the basic construction of an optical data reading apparatus in which the second harmonic wave generator of the present invention is installed.

A circular disc-like optical disc 21 is rotated by a spindle motor 23 at a predetermined angular speed. A digital information recorded in the optical disc 21 is read by an optical pickup 22 having a shaft sliding rotation type driving structure. A bobbin 36 is rotatably inserted in a shaft 32 mounted on a fixing table 29 on the optical pickup 22, and the bobbin 36 is normally fixed to the table 29 at a predetermined position by means of a rubber spring 27. The bobbin 36 is provided with a focusing coil 28 which moves slidingly for focusing the optical pickup 22 to the direction of a shaft 32, and a tracking coil 26 which rotates for tracking the optical pickup 22 around the shaft 32.

The focusing coil 28 and the tracking coil 26 constitute a magnetic circuit in association with a solenoid 25 mounted on an external yoke 24. When an electric current is supplied to the solenoid 25, the bobbin 36 is moved by sliding in the direction of the shaft 32 and by rotation around the shaft 32 to a position where a magnetic force produced in the solenoid 25 is balanced with a spring force by the rubber spring 27.

As a driving member for moving the optical pickup 22 to the radial direction of the optical disc 21, a linear d.c. motor 30 disposed at the lower portion of the fixing table 29 is used. The entirety of the fixing table 29 is moved slidingly on a table 31 fixed at a predetermined position, by means of the linear d.c. motor 30, whereby scanning is performed during the movement of the pickup to the radial direction of the optical disc 21. An optical digital information from the optical pickup 22 is introduced through optical fibers 33, is detected by a photosensor 34 and is transferred to a signal treating section 35. The signal treating section 35 has treating circuits in which the transformation of digital signals into sound frequency signals, color signals and brightness signals are effected.

Since the above-mentioned optical information reading apparatus uses the second harmonic wave generator of the present invention as a light source for the optical pickup 22 in which the wavelength used is 430 nm which is as half as 860 nm in a conventional LD. Accordingly, the reading apparatus can read information stored in the optical disc 21 which has a recording density of 4 times as large as that of the conventional optical disc.

The optical information reading apparatus is not limited to the above-mentioned construction, but various construction and arrangement can be employed.

The present invention has an excellent effect wherein a second harmonic wave output is modulated for phase matching by the application of an electric field to the electrodes provided on the nonlinear optical member. Further, in the nonlinear optical member having polarization structure, the second harmonic wave output can be modulated at a high degree of modulation without any damage to the nonlinear optical member by applying an electric field in the direction and with the polarity so as not to change the direction of polarization.

Obviously, numerous modifications and variations of the present invention are possible in light of the above teachings. It is therefore to be understood that within the scope of the appended claims, the invention may be practiced otherwise than as specifically described herein.

What is claimed is:

1. A harmonic wave generator comprising a light source for generating a fundamental wave and a nonlinear optical member including a resonator, which transforms the fundamental wave to a harmonic wave, wherein the nonlinear optical member is formed along an a-axis, a b-axis perpendicular to the a-axis, and a c-axis perpendicular to the a-axis and the b-axis, and wherein the nonlinear optical member is provided with electrodes for applying an electric field to at least a pair of opposing surfaces, wherein the nonlinear member is a $KNbO_3$ crystal provided with electrodes and wherein the electrodes are provided on the $KNbO_3$ crystal so that an electric field is applied to the crystal along the b- and c- axis directions of the crystal.

2. The harmonic wave generator according to claim 1, further comprising a polygon means in the resonator through which the light propagates.

3. The harmonic wave generator according to claim 2, further comprising a triangle means in the resonator through which the light propagates.

4. The harmonic wave generator according to claim 1, wherein a semiconductor laser is used as the light source and weak waves which result from the scattering of light in the resonator, are introduced into the light source as a feedback signal, whereby the resonant frequency of the semiconductor laser is stabilized based on the feedback signal.

5. A harmonic wave generator comprising a light source for generating a fundamental wave and a nonlinear optical member including a resonator, which transforms the fundamental wave to a harmonic wave, wherein the nonlinear optical member is formed along an a-axis, a b-axis perpendicular to the a-axis, and a c-axis perpendicular to the a-axis and b-axis, and wherein the nonlinear optical member is provided with electrodes for applying an electric field to at least first and second opposing surfaces in the c-axis direction defining a +c face and a −c face, wherein the nonlinear member is a $KNbO_3$ crystal provided with electrodes and wherein the electrodes are provided on the +c face and −c face of the crystal so that the electric field is applied to the crystal in the c-axis direction wherein the +c face has a negative polarity and the −c face has a positive polarity.

6. The harmonic wave generator according to claim 5, further comprising a polygon means in the resonator through which the light propagates.

7. The harmonic wave generator according to claim 6, further comprising a triangle means in the resonator through which the light propagates.

8. The harmonic wave generator according to claim 5, wherein a semiconductor laser is used as the light source and weak waves which result from the scattering of light in the resonator, are introduced into the light source as a feedback signal, whereby the resonant frequency of the semiconductor laser is stabilized based on the feedback signal.

9. A harmonic wave generator comprising a light source for generating a fundamental wave and a nonlinear optical member including a resonator, which transforms the fundamental wave to a harmonic wave, wherein the nonlinear optical member is provided with electrodes for applying an electric field to at least a pair of opposing surfaces, and further comprising a polygon means in the resonator through which the light propagates.

10. The harmonic wave generator according to claim 9, wherein the nonlinear optical member is provided with electrodes which apply an electric field in an axial direction of the nonlinear optical member wherein a response characteristic of a refractive index of the nonlinear optical member to the electric field with respect to the harmonic wave becomes highest.

11. The harmonic wave generator according to claim 9, wherein the nonlinear optical member is formed along an a-axis, a b-axis perpendicular to the a-axis, and a c-axis perpendicular to the a-axis and b-axis, and wherein the nonlinear optical member is provided with electrodes by which an electric field is applied from plural directions.

12. The harmonic wave generator according to claim 9, wherein the nonlinear member is a $KNbO_3$ crystal.

13. The harmonic wave generator according to claim 12, wherein the electrodes are provided on the $KNbO_3$ crystal so that an electric field is applied to the crystal along the c-axis direction of the crystal through first and second opposing surfaces in the c-axis direction defining a +c face and a −c face.

14. The harmonic wave generator according to claim 13, wherein the electrodes are provided on a +c face and a −c face of the crystal so that the electric field is applied to the crystal in the c-axis direction wherein the +c face has a negative polarity and the −c face has a positive polarity.

15. The harmonic wave generator according to claim 12, wherein the electrodes are provided on the $KNbO_3$ crystal so that an electric field is applied to the crystal along the b- and c- axis directions of the crystal.

16. The harmonic wave generator according to claim 9, further comprising a triangle means in the resonator through which the light propagates.

17. The harmonic wave generator according to claim 9, wherein a semiconductor laser is used as the light source and weak waves which result from the scattering of light in the resonator, are introduced into the light source as a feedback signal, whereby the resonant frequency of the semiconductor laser is stabilized based on the feedback signal.

* * * * *